April 21, 1964 C. D. VISOS 3,129,649
AUTOMATIC TOASTER
Filed Oct. 3, 1960 3 Sheets-Sheet 3

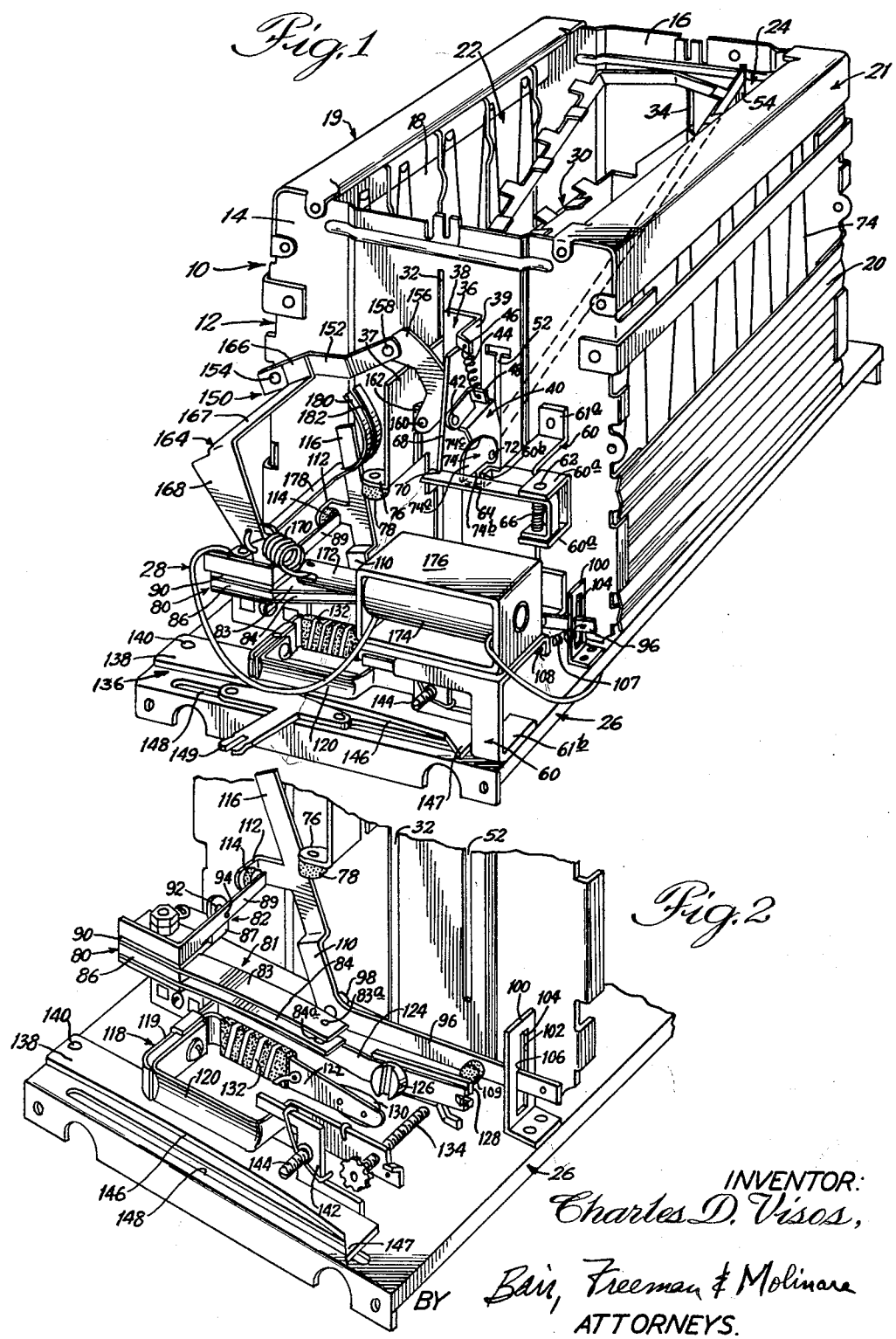

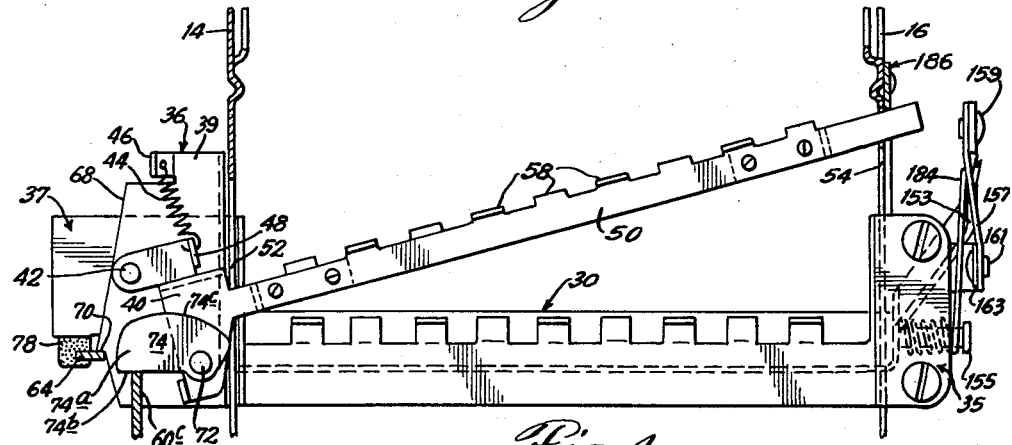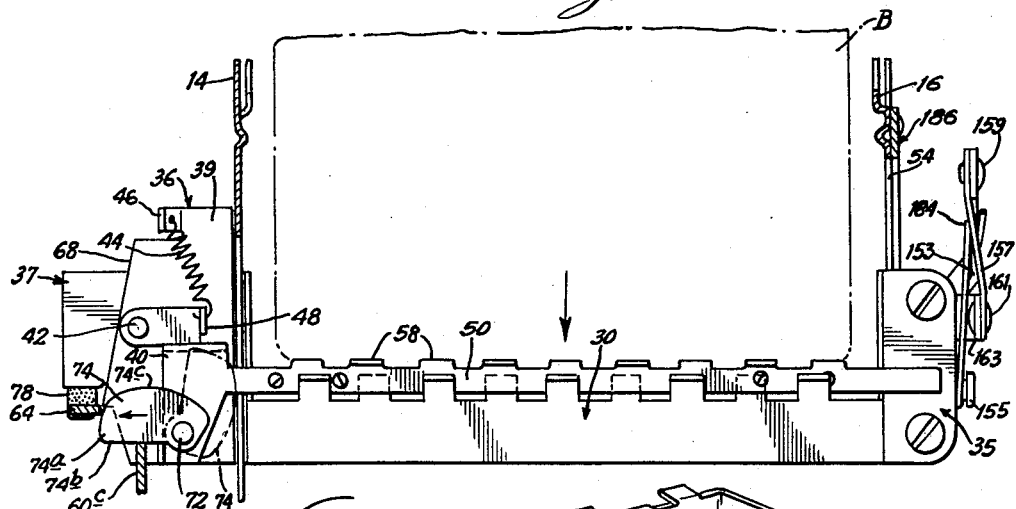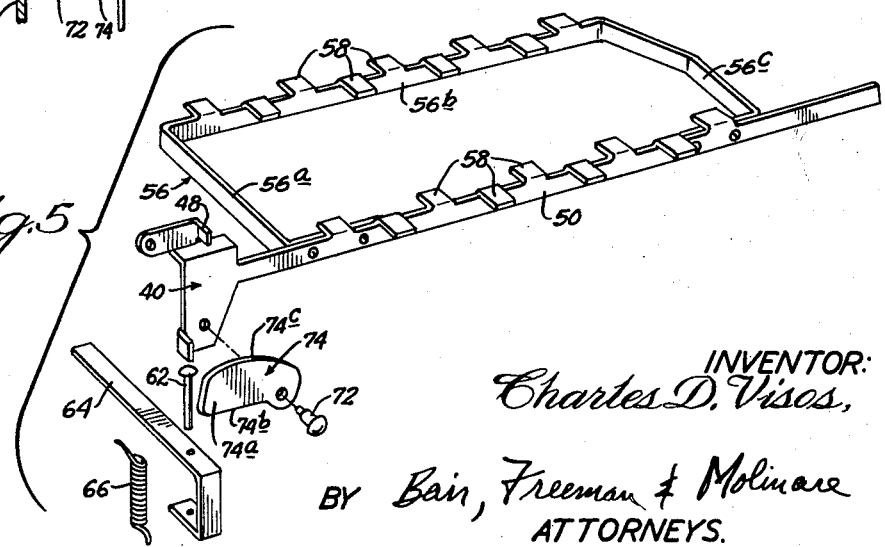

INVENTOR:
Charles D. Visos,
BY Bair, Freeman & Molinare
ATTORNEYS.

United States Patent Office 3,129,649
Patented Apr. 21, 1964

---

3,129,649
AUTOMATIC TOASTER
Charles D. Visos, St. Louis, Mo., assignor to Knapp-Monarch Company, St. Louis, Mo., a corporation of Delaware
Filed Oct. 3, 1960, Ser. No. 59,931
15 Claims. (Cl. 99—327)

This invention relates to improvements in automatic toasters and more particularly relates to carrier mechanisms for automatic toasters and the bread return assembly therefor.

In a fully automatic toaster, a first means is usually provided to automatically move the bread carriage down to toasting position and a second means is provided for automatically moving the bread carriage to its raised position after termination of the toasting cycle. Where levers are used to effect unlatching of the bread carriage from its up position to initiate a toasting cycle and thereafter to effect latching of the bread carriage into its up position at the end of a toasting cycle, it has been observed that such lever systems are very sensitive and are susceptible of becoming inoperative due to extensive use or due to damage by reason of a sharp blow to the toaster. Furthermore, in such lever systems there exists the possibility of the toaster inadvertently re-cycling automatically before the finished toast is removed.

Thus, one object of this invention is to provide an automatic toaster mechanism which is simple but rugged so as to provide effective automatic operation thereof without necessity of frequent servicing and which is provided with effective means to prevent inadvertent re-cycling of the toaster until the finished toast is removed from the toaster.

Another object is to provide an automatic toaster in which no electrical contacts are energized or de-energized when the bread is inserted into the toaster and wherein only a simple mechanical arrangement is relied upon, responsive to insertion of a bread slice, to effect release of the bread carrier to move by gravity to a lowered toasting position.

In the automatic toaster of this invention the lowering of the bread carriage is initiated by the insertion of a bread slice into the toaster which operates to effect unlatching of a latch means so that the bread carriage then falls under gravity to a toasting position. When the toasting cycle is completed, a solenoid is energized momentarily to initiate movement of the bread carriage toward up position, but the energization of the solenoid is terminated before the carriage reaches the up position, so that the inertia of the upwardly moving carriage is relied upon to move the carriage into the full up position. Because of the dynamics of such an inertia system to effect raising of the bread carriage, there exist a number of difficulties involved in insuring that the upwardly moving toast or carriage therefore does not operate the carriage release mechanism to effect re-cycling and in insuring that the carriage does not rise too rapidly or with undesirable force or accompanying noise.

Thus, still another object of this invention is to provide an automatic toaster wherein the bread carriage thereof is returned to its up position partially by an inertia system and wherein means are provided to prevent inadvertent re-cycling of the toaster.

And another object is to provide a bread return for an automatic toaster which obviates the difficulties of obtaining uniform and reliable operation of an automatic toaster that may be subjected to a wide variety of variable conditions of operation.

It is another important object of the present invention to provide a new and improved automatic toaster with improved construction of a bread return assembly therefor, which overcomes difficulties attendant to prior constructions.

In toasters of the automatic type which have an automatic bread return assembly, and especially, in the pop-up toasters, difficulties have been encountered due to variations in the conditions which govern the operation of the return assembly. Among other reasons, these difficulties arise due to variations in the electrical potential applied to the operating mechanisms and variations in size and weight of the bread slices. These difficulties are encountered in fully automatic toasters and those semi-automatic toasters which include an automatic bread return mechanism.

Thus, still a further object of this invention is to provide a solenoid-driven bread return assembly which is less dependent for its operating characteristics on the power supply for the toaster or on the characteristics of the bread slice being toasted.

An additional object is to provide a bread return assembly which cooperates with the remaining structure consistently in the manner in which it is designed to operate, and which avoids operating extremes conductive to malfunctioning.

A further object is to provide a simple, compact, reliable and economical bread return assembly which accomplishes the above objects.

These and other objects, advantages and functions of the invention will be apparent upon reference to the specification and to the accompanying drawings, in which like reference characters indicate like elements in each of the views, and in which:

FIGURE 1 is a front perspective view of an automatic toaster with the outer casing and the toasting compartment divider removed, illustrating a preferred embodiment of the invention;

FIGURE 2 is a fragmentary view similar to FIGURE 1 but at a different angle so as to illustrate the timer assembly and the solenoid switch, and associated structure;

FIGURE 3 is a longitudinal sectional view of a portion of the toaster, illustrating the apparatus for suspending the bread carrier in its up position prior to insertion of a bread slice;

FIGURE 4 is a view like FIGURE 3, following insertion of a bread slice into the toaster and at the moment of release of the bread carrier from the up position;

FIGURE 5 is an exploded perspective view of the bread carrier release lever assembly and the latch associated therewith;

Figure 6:
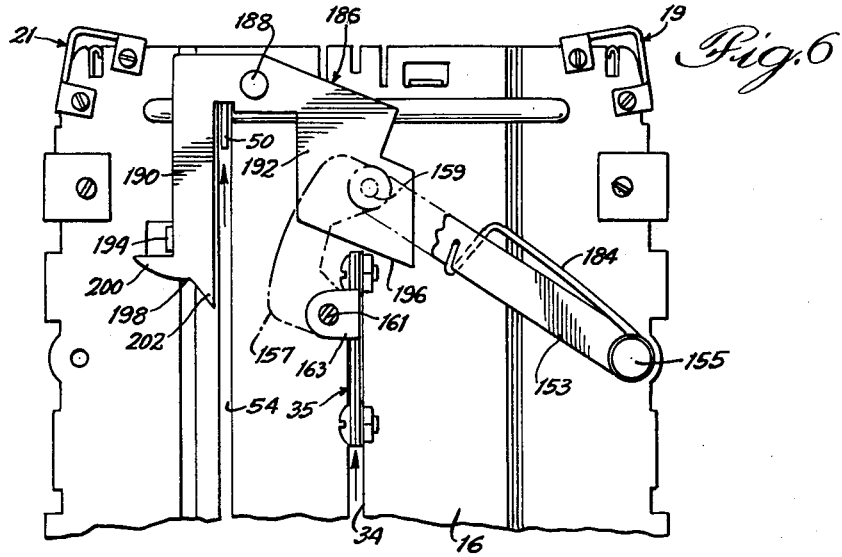
Figure 7:
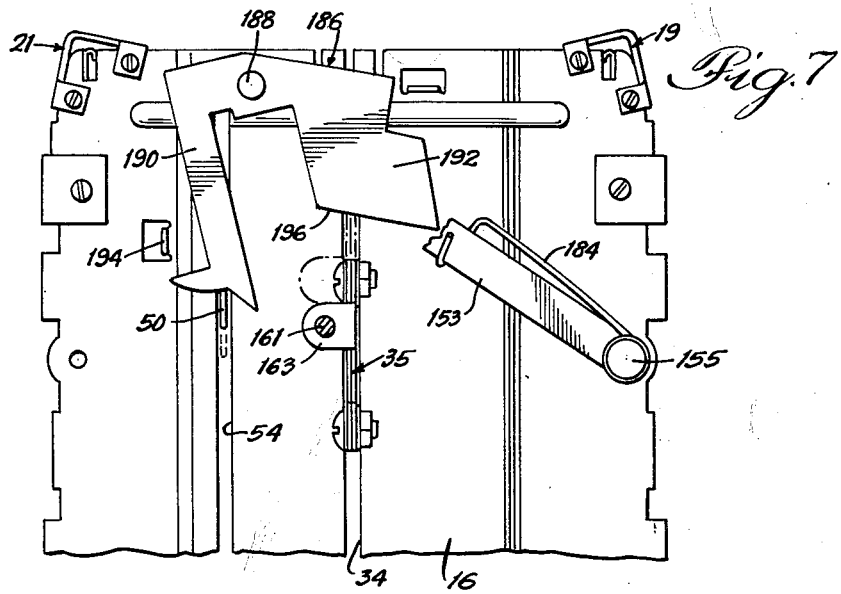

FIGURE 6 is a partial rear elevational view of the device shown in the preceding views, illustrating the parts in their starting or up position at the beginning of a bread toasting cycle; and FIGURE 7 is a view similar to FIGURE 6 but illustrating the parts including the bread carrier release lever in an intermediate position when the bread carrier is moving from the toasting position to its up position.

Before proceeding with a detailed description of the device herein disclosed, it should be noted that basically this toaster is an automatic-carrier-type toaster having a normally latched bread carriage which is released from the latch upon insertion of a bread slice, whereupon the carriage falls under gravity to a toasting position. A timer mechanism starts upon energization of the toasting means which, in turn, is energized when the carriage is adjacent the lowered, toasting position. When the toasting period has been timed out, an energizing means including a solenoid motor is energized momentarily to move the carriage toward up position, and after a short movement upwardly the solenoid is de-energized but inertia of the carriage carries it to the up position where a latch engages and retains the carriage. A special mechanical lock-out mechanism prevents re-cycling until the finished toast has been fully removed. Thereafter, insertion of a fresh bread slice starts the cycle again.

In certain of its aspects, particularly in the force-transmitting means which initiates upward movement of the bread carrier, this invention includes the providing of a spring means connected between the bread carrier and the solenoid, and said solenoid is adapted to transmit its carriage-restoring force through the spring means to thereby move the bread carrier from its toasting position to its non-toasting position. The spring means modulates the force transmitted from the solenoid and renders the operation of the bread return assembly uniform and reliable. The associated structure then functions in the intended manner to complete an operating cycle and set the apparatus for the start of a new cycle.

Referring to the drawings, a fully automatic toaster, generally indicated at 10, is illustrated with its outer casing removed. The interior structure includes a toasting compartment casing, or frame, 12 which includes a front end panel 14, a back end panel 16, side walls 18 and 20, and rigidifying corner frames 19 and 21. The casing 12 defines a left toasting compartment 22 and a right toasting compartment 24 within the casing, which are normally separated by a partition, or divider, of the conventional type which has been removed in the figures for purposes of clarity of illustration. The casing 12 is mounted on a horizontal support, or base, 26. The support 26 extends longitudinally beyond the front end wall 14, and supports thereon an operating assembly generally indicated by the numeral 28. An additional portion of the operating assembly is mounted outwardly of the back end wall 16 as seen in FIGURES 6 and 7 and as hereinafter described.

A bread carrier 30 is provided having portions thereof located in the toasting compartments 22 and 24. The carrier is vertically movable cyclically relative to the toasting means in the toaster from a raised, non-toasting, up position, as illustrated in FIGURE 1, to a lowered, toasting, down position, and then back to the up position. The bread carrier 30 is provided with control portions that extend through elongated vertical slots 32 and 34 that are provided respectively in the front and rear panels 14 and 16. The control portions of the carrier 30 that extend outwardly of panels 14 and 16 provide means upon which are mounted portions of the operating assembly. The rear extension of carrier 30 is seen at 35 in FIGURES 6 and 7. The front extension of carrier 30 is concealed in the figures but it has rigidly attached to it a shaped, sheet metal part 36 which is located outwardly of panel 14 and which conceals said front extension of carrier 30.

The sheet metal part 36 has a first vertical portion 37 located adjacent slot 32 and extending transversely of panel 14, a second portion 38 parallel to and closely spaced from panel 14, and a third portion 39 parallel to the first portion 37 and spaced therefrom. A shaped, sheet metal part 40 is mounted on a pin 42 that is carried by said third portion 39 for pivoting about a horizontal axis. A spring 44, connected between tabs, or flanges, 46 and 48 formed respectively on parts 36 and 40, normally biases part 40 to the position seen in FIGURES 1 and 3. The part 40 carries an elongated arm 50 that, in the preferred form, is integral with part 40. The arm 50 extends through a vertically elongated slot 52 in panel 14 to project into and across toasting chamber 24 and to protrude outwardly of panel 16 through a vertically elongated slot 54 in said panel 16.

The arm 50 carries a sheet metal part 56 which defines transverse portions 56a and 56c, and a longitudinal portion 56b parallel to and spaced from arm 50 and located in toasting chamber 22. The arm 50 and portion 56b are each shaped to define a plurality of alternately extending tabs 58 adapted to be engaged by the lower edge of a slice of bread to be toasted. The combination of arm 50 and part 56 defines a bread responsive lever that is normally in the inclined attitude of FIGURE 3 by reason of a weak spring 44, but which lever is adapted to be engaged by a slice of bread B inserted into either toasting compartment to swing the lever to the horizontal, bread-loaded, attitude seen in FIGURE 4. The elongated slots 52 and 54 accommodate the swing of arm 50 both in its pivotal movement about pin 42 and in its vertical movement with the bread carriage 30 as the carriage moves between raised and lowered positions.

An elongated bracket 60 formed of heavy sheet metal is mounted to attach to panel 14 at 61a and to base 26 at 61b. The bracket 60 is located so that slot 52 is located laterally between the bracket mounting 61a and part 36. Bracket 60 defines a pair of vertically spaced ears 60a which are spaced outwardly of panel 14 and which carry a vertically positioned pin 62 upon which is pivoted a latch lever 64 that extends toward part 36. A coil spring 66 concentric with pin 62 and anchored to bracket 60 normally biases the lever 64 so that its extended end tends to move toward panel 14. Bracket 60 defines a stop 60b that is positioned across the path of movement of lever 64 to limit movement of lever 64 toward panel 14. The bracket 60 also defines a stop 60c that is best seen in FIGURES 3 and 4 and is located between latch 64 and panel 14 and is adapted to be engaged by pawl that is hereinafter described.

The portion 39 of part 36 is shaped to define an upright edge 68 that inclines downwardly and outwardly relative to panel 14 and which terminates at its lower end at a latching shoulder 70. When the carriage 30 is in its raised position, the lever 64 has a portion thereof located below latching shoulder 70 so as to engage and maintain carriage 30 raised, as seen in FIGURE 1. When carriage 30 begins to rise from its lowered position the inclined edge 68 cams against the inner edge of lever 64 and biases lever 64 outwardly against the bias of spring 66 until shoulder 70 rises above lever 64, whereupon spring 66 moves lever 64 toward panel 14 and below shoulder 70 to effect latching the carriage 30 in the raised position.

The part 40 carries a headed pin 72 whose axis is parallel to the axis of pin 42 and upon which is pivotally mounted an elongated pawl 74. The pawl 74 is eccentrically mounted at one end thereof on pin 72 as shown, and pawl 74 includes an extended actuator tip 74a that is bounded with one longitudinal edge 74b that extends nearly radially of pin 72. When pawl 74 is in its operative position shown in full lines in FIGURE 3, the edge 74b engages the upper edge of stop 60c. The center of gravity of pawl 74 is so located relative to the axis of pin 72 and to the shape of pawl 74 that by appropriate location of the stop 60c, the pawl is caused to be located either in the lever releasing position of FIGURE 3 or in the inoperative position shown in dot-dash lines in FIGURE 4. In the inoperative position, the curved pawl edge 74c engages the outer side of end panel 14 and this locates the pawl so that when the lever arm 50 pivots from the position of FIGURE 4 to the position of FIGURE 3, then the axis of pin 72 moves between the center of gravity of pawl 74 and panel 14, and this causes the pawl 74 to fall to the full line position of FIGURE 3.

The portion 37 of sheet metal part 36 has a lower foot part 76 which carries thereon a switch-engaging button 78 made of insulating material, or the like. The toaster is provided with a stacked switch arrangement indicated at 80 which includes a normally open main switch 81 for controlling energization of the toaster's heating elements and a second switch 82 for controlling energization of a carriage-returning electric motor. The blades of the main switch 81 are elongated, flexible, metal blades 83 and 84 that are separated by an insulator 86. The second switch 82 includes a first conductor 87 that is in electrical connection with upper blade 83 and a second, elongated, flexible blade 89 that is spaced from conductor 87 by insulator 90. The blades 83 and 84 respectively carry normally spaced contact points 83a and 84a. The conductors 87 and 89 carry normally closed, or engaging, contacts 92 and 94.

There is provided a pivotable arm 96 mounted for pivoting about pin 98 carried by the frame. The laterally extended end of arm 96 extends through a labyrinth, or positioning, plate 100 that is cut out to form an irregular aperture, or labyrinth, generally indicated at 102, which cooperates with the arm 96 to define a pair of positions for the arm 96. The labyrinth includes an upper edge 104 against which the arm 96 rests in one position and a lower edge 106 against which the arm 96 rests in a second position. The extended end of arm 96 is connected by an inclined spring 107 to an anchor 108 that is bent from bracket 60 and which is spaced above plate 100 so that the arm 96 is normally biased upwardly against the edge 104 or 106. The arm 96 carries an anvil 109 of insulating material that is positioned between the labyrinth plate 100 and pivot pin 98.

The arm 96 is shaped to extend upwardly as indicated at 110 and has an offset arm 112 that carries an insulator button 114 which is positioned to cooperate with the extended end of flexible switch blade 89 of the second switch. The arm 110 extends upwardly above offset 112 to define an upper extension 116.

A timer means generally indicated at 118 is provided for the toaster, and is of the type generally disclosed in Patent No. 2,778,902. The timer 118 includes a spring blade arm 119 which carries a formed arm 120 of relatively rigid material and which is spaced from a bimetal arm 122 which, in turn, is normally spaced from a potentializable, flexing leaf-spring, arm 124 that carries a magnet 126. The extended end of arm 124 carries an impact abutment 128 adapted to strike against anvil 109 carried by arm 96. The bimetal arm 122 carries a magnet keeper 130 for cooperation with magnet 126. A heating wire 132 is wrapped around a portion of bimetal 122 for purposes as explained in the said Patent No. 2,778,902. The arm 120 carries an adjustable abutment screw 134 positioned to be engaged by the extended end of arm 124.

The toaster is also provided with a slide-type color control and carriage release generally indicated at 136, of the type disclosed in my co-pending application, Serial No. 842,760, now Patent No. 3,032,424. The color control includes an elongated arm 138 that is pivotally mounted on pin 140 carried on the base 26 of the toaster. The arm 138 has an upright flange 142 which carries an adjustment screw 144 for cooperation with arm 120. The arm 138 is provided with a curved cam edge 146 and another cam edge 147 extending sharply relative to edge 146. The toaster frame is provided with a track slot 148 in which an actuator 149 may move in cooperation with the cam edge 146. The spring blade 119 operates through arm 120, screw 144, and flange 142 to bias arm 138 against actuator 149. The operation of the color control and release are as described in my said co-pending application, Serial No. 842,760, and it will be understood that as actuator 149 is moved along track slot 148 in engagement with cam edge 146, it varies the position of the abutment screw 134 carried by arm 138 relative to arm 124. This varies the period of the timing means 118 and thereby controls the color of the toast produced. The actuator 149 moving against cam edge 147 operates to move arm 124 against anvil 109 to effect manual termination of the toasting cycle.

The toaster is provided with a carriage raising means generally indicated at 150, which includes an arm 152 positioned outwardly of panel 14, and an arm 153 spaced outwardly of panel 16, both of which are tied together for pivoting about a common axis that is positioned adjacent one side of the frame. The axis may be that of a rockshaft or of a pair of spaced and axially aligned pivot pins 154 and 155 that are mounted adjacent one edge of the frame. The extended ends of the arms 152 and 153 are respectively pivoted to elongated links 156 and 157 by means of pins 158 and 159. The other ends of links 156 and 157 are pivotally connected to pins 160 and 161 that are connected to the carriage. The axes of pins 158 and 159 and of pins 160 and 161 are aligned for proper operation. The pin 160 is carried on a flange 162 which is spaced outwardly of panel 114, and the pin 161 is pivoted on flange 163 that is spaced outwardly of panel 16.

There is provided an actuator 164 which is connected at 166 to arm 152. The actuator has a portion 167, which extends transverse to panel 14 and parallel to the axes of pins 154 and 155, and which terminates in a flange 168. A coil spring 170 connects to flange 168 and at its other end to solenoid plunger 172 that is arranged for horizontal movement in the bore of a solenoid coil 174 that is carried by a solenoid mounting frame 176 that is supported on another portion of bracket 60. The flange 168 has an inwardly extending extension 178 that is parallel to part 167 and to the axes of pins 154 and 155, and which carries at its inner end a bifurcated bowed actuator 180 having a central slot 182 for reception of the extension 116 of arm 96.

The arm 153 located outwardly of panel 16 is cooperatively engaged by an arm of a coil spring 184 whose coil is carried on the elongated shank of pin 155 and which is anchored relative to the frame. The spring 184 serves to counterbalance carriage 30, but the weight of carriage is such as to insure that carriage 30 remains lowered to close main switch 81 until solenoid coil 174 is energized.

The fact that conductor 87 of second switch 82 is in electrical connection with blade 83 of first switch 81 arranges second switch 82 in series with first switch 81, so that solenoid coil 174 may be energized only when both switches 81 and 82 are closed. The switches 81 and 82 are in series with solenoid coil 174 although switch 82 and coil 174 are in parallel with the toaster's heater elements which are, in turn, controlled by switch 81.

Referring now to the operative elements shown in FIGURES 6 and 7, there is provided an inverted, irregularly U-shaped, cam 186 that is pivotally mounted by its bight on a pin 188 that is carried on rear panel 16. The cam 186 provides one arm 190 that is positioned adjacent slot 54 and the other arm 192 extends generally transversely of, but adjacent, slot 34. The panel 16 carries a stop 194 adapted to cooperate with arm 190. The arm 192 has an inclined edge 196 which extends across slot 34 for reasons that will become apparent hereinafter. The extended end of arm 190 is shaped to define a crotch 198 between ears 200 and 202, and the crotch 198 is adapted to receive the extended end of lever arm 50, the operation of which will be described hereinafter.

*Operation*

In the operation of the device, the parts are normally in the position as illustrated in FIGURE 1. As shown in FIGURE 1, the lever arm 50 is normally swung upwardly under the bias of spring 44 and in this position the pawl 74 projects longitudinally outwardly, as seen in FIGURE 3, and is maintained in the position shown by engagement of pawl edge 74b with the upper edge of stop 60c. The latch 64 is normally biased by spring 66 to the position seen in FIGURES 1 and 3, with the extended end 74a of pawl 74 spaced short of latch 64. The latch 64 engages the shoulder 70 formed on part 39, and thereby the carriage is sustained in its raised, non-toasting, position.

Upon entry of one or more slices of bread to be toasted into the toaster, the arm 50 is engaged by the bread slice B and the bread lever pivots downwardly about the axis of pin 42 to the position shown in FIGURE 4. As the lever arm 50 swings away from its unloaded position to the position in FIGURE 4, the extended end 74a of pawl 74 is projected outwardly and engages the inner edge of latch 64 to displace the latch 64 from its carriage-restraining position sufficiently to clear the shoulder 70, whereupon the carriage falls by gravity to a lowered toasting position.

After the pawl 74 has moved latch 64 and as the carriage moves downwardly, the pawl 74 passes the stop 60c and as the pawl passes such stop it is engaged thereby and pivoted to the inoperative position shown in dot-dash lines in FIGURE 4. Since the center of gravity of the pawl is located off-center with regard to the pivot pin 72, the pawl 74 will be maintained in its inoperative position between the latch 64 and the panel 14, and even at the end of the toasting cycle, until the bread is removed from the toaster, at which time the movement of the arm 50 to its first, normally unloaded, position, as shown in FIGURE 3, will only then move the center of gravity of the pawl to the left of the axis of pin 72 as viewed in FIGURE 3, whereupon the pawl will fall back to the full-line, operative, position shown in FIGURE 3.

Now, continuing with the operation of the device as the carriage is moved to its lowered position, it will be first noted that the arm 96 normally is in engagement with the edge 106 of the labyrinth, and in this position the insulator 114 engages the extended end of flexible contact arm 89 to space the contact 94 from engagement with the contact 92. Thus, the second switch is open and the solenoid coil 174, which is in series with the second switch 82, is de-energized.

When the carriage 30 falls to its lowered position the insulator button 78 engages the upper blade 83 of the normally open main switch 81 and depresses same to effect closure of the main switch. The weight of the carriage maintains switch 81 closed so as to energize the heater elements of the toaster to effect toasting of the bread within the toaster.

At the same time that the toaster's heater elements are energized, the timer 118 is put into operation in the manner as described in Patent No. 2,778,902 and a toasting period is timed out by the timing means. This involved first the warping of the bimetal arm 122 toward the arm 124 until the magnet 126 and magnet keeper 130 contact each other, whereupon the heater wire 132 is shorted, thereby permitting the bimetal 122 to warp in the other direction to potentialize arm 124 until the extended end of arm 124 engages the tip of screw 134, whereupon as the bimetal 122 continues to cool, eventually the magnet 126 and the keeper 130 are separated, whereupon the potentialized arm 124 swings against the anvil 109 to move the arm 96 away from engagement with edge 106 so that the spring 107 will pull the arm 96 up against the edge 104.

The movement of the arm 96 against edge 104 permits the contacts 92 and 94 of the second switch 82 to close since the spring blade 89 is normally biased toward a switch-closing position, whereupon the solenoid coil 174 is energized, thereby drawing the solenoid plunger 172 axially into the coil. The electromagnetic force that is imposed upon plunger 172 is transmitted through spring 170 to the actuator 164 which operates to pivot the arms 152 and 153 about the axes of pins 154 and 155 to move the carriage 30 in the upward direction. The transmission of force through spring 170 modulates the carriage-raising force of the solenoid and even though the voltage applied across solenoid coil 174 may vary, the operation of the carriage-restoring means is maintained at preferred velocities. In the absence of the modulating spring 170, when high voltages are applied to solenoid coil 174, the carriage 30 may rise too rapidly causing throwing of the toast and possibly effecting recycling.

The carriage is counterbalanced by the spring 184, and the modulated force that is transmitted from plunger 172 to actuator 164 through spring 170 throws the carriage upwardly, and the inertia of the carriage operates to move the carriage into the raised, non-toasting position. As the carriage moves upwardly, the bight of the bifurcated actuator 180, being responsive to movement of carriage 30, moves to engage the extension 116 of arm 96 and operates to swing the arm 96 downwardly from engagement with edge 104, whereupon the spring 107 pulls the arm 96 into position for engagement with the stop edge 106, at which position the insulator 114 has again engaged the extended end of blade 89 to open the switch leading to the solenoid coil, and to condition that portion of the toaster for a succeeding toasting cycle.

During the upward movement of the carriage 30 which is at substantial velocity, it will be understood that the toast has inertia imparted thereto and if the toast continued to rise after the carriage reached its up position, the arm 50 might also rise, and this might effect recycling of the carriage-lowering-and-raising system thus far described. In order to insure that there is no such inadvertent re-cycling, the carriage part 35, as it moves upwardly as seen in FIGURE 6, first engages the inclined edge 196 of cam 186 and swings the cam 186 to the position as shown in FIGURE 7, wherein the arm 190 extends as a barrier across the slot 54 and the crotch 198 receives the extended end of arm 50 and prevents further upward movement of lever arm 50 which might initiate re-cycling. In the position shown in FIGURE 7, the carriage has moved upwardly sufficiently so that the shoulder 70 is spaced above the latch 64.

As the carriage moves upwardly, the inclined edge 68 on part 36 has forced the latch 64 outwardly until the shoulder 70 passes above the latch 64. Then the carriage 30 settles down under gravity until the shoulder 70 re-engages the latch 64 to keep the carriage in its raised position at the end of the toasting cycle. As the carriage settled down, the arm 50 lowers from crotch 198 to a position where it may be cleared by ear 202.

When the carriage is in resting position supported by latch 64, the arm 192 of the cam 186 being heavier than arm 190 swings the cam clockwise to the position shown in FIGURE 6. The clockwise movement of the cam 186 is limited by the stop 194 against which the arm 190 abuts. The cam 186 is then in the position shown in FIGURE 6. Then, and only upon the removal of the toast from the toaster, the arm 50 will move upwardly through slot 54 to the elevated position shown in FIGURE 6, where the toaster is then in a position to start a new cycle.

Throughout the entire travel of the carriage 30 from the lowered, toasting, position to the raised, non-toasting, position, the pawl 74 is maintained in the dotted-line position shown in FIGURE 4, where it is inoperative. The pawl 74 is not returned to its operative position as shown in full lines in FIGURE 3 until the toast is removed from the carriage.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A fully automatic toaster comprising, in combination: bread toasting means; a loadable bread carrier cyclically movable relative to said bread toasting means from a non-toasting position to a toasting position and then back to said non-toasting position; and control means for automatically initiating movement of said bread carrier away from said non-toasting position, upon loading of a bread slice onto the carrier when the carrier is unloaded, and for maintaining said bread carrier in said non-toasting position at the end of a toasting cycle, as long as the carriage is either loaded with at least one toasted bread slice or has not been loaded with a bread slice to be toasted, said control means including a pivotable lever mounted on said carriage and normally biased toward an unloaded position, said lever being adapted to be engaged by a slice of bread entered onto said carriage to pivot to a loaded position, a pawl mounted on said lever for pivoting about an axis parallel to the axis about which the lever pivots, a movable latch biased to engage the carriage to restrain the carriage in the non-toasting position and adapted to be engaged by the pawl to be moved by the pawl away from carriage-restraining position as the lever is being pivoted away from its unloaded position, and means for pivoting the pawl to an inoperative position after it has so moved the latch and as the carriage moves away from the non-toasting position.

2. A fully automatic toaster comprising, in combination: bread toasting means; a loadable bread carrier cyclically movable relative to said bread toasting means from a non-toasting position to a toasting position and then back to said non-toasting position; and control means for automatically initiating movement of said bread carrier away from said non-toasting position, upon loading of a bread slice onto the carrier when the carrier is unloaded, and for maintaining said bread carrier in said non-toasting position at the end of a toasting cycle, as long as the carriage is either loaded with at least one toasted bread slice or has not been loaded with a bread slice to be toasted, said control means including a pivotable lever mounted on said carriage and normally biased toward an unloaded position, said lever being adapted to be engaged by a slice of bread entered onto said carriage to pivot to a loaded position, a pawl mounted on said lever for pivoting about an axis parallel to the axis about which the lever pivots. a movable latch biased to engage the carriage to restrain the carriage in the non-toasting position and adapted to be engaged by the pawl to be moved by the pawl away from carriage-restraining position as the lever is being pivoted away from its unloaded position, means for pivoting the pawl to an inoperative position after it has so moved the latch and as the carriage moves away from the non-toasting position, and means for maintaining the pawl in said inoperative position and spaced from the latch as long as the carriage is loaded with a toasted bread slice.

3. A fully automatic toaster comprising, in combination: bread toasting means; a loadable bread carrier cyclically movable relative to said bread toasting means from a non-toasting position to a toasting position and then back to said non-toasting position; and control means for automatically initiating movement of said bread carrier away from said non-toasting position, upon loading of a bread slice onto the carrier when the carrier is unloaded, and for maintaining said bread carrier in said non-toasting position at the end of a toasting cycle, as long as the carriage is either loaded with at least one toasted bread slice or has not been loaded with a bread slice to be toasted, said control means including a pivotable lever mounted on said carriage and normally biased toward an unloaded position, said lever being adapted to be engaged by a slice of bread entered onto said carriage to pivot to a loaded position, a pawl mounted on said lever for pivoting about an axis parallel to the axis about which the lever pivots, a movable latch biased to engage the carriage to restrain the carriage in the non-toasting position and adapted to be engaged by the pawl to be moved by the pawl away from carriage-restraining position as the lever is being pivoted away from its unloaded position, means for pivoting the pawl to an inoperative position after it has so moved the latch and as the carriage moves away from the non-toasting position, said latch being operative to re-engage said carriage to restrain it in non-toasting position at the end of a toasting cycle, and means for maintaining the pawl in said inoperative position and spaced from the latch as long as the carriage is loaded with a toasted bread slice.

4. A fully automatic toaster comprising, in combination: bread toasting means; a loadable bread carrier cyclically movable relative to said bread toasting means from a non-toasting position to a toasting position and then back to said non-toasting position; means normally restraining the bread carrier in its non-toasting position; release means including a movable lever positioned to be engaged by a bread slice and connected to one end of said bread carrier and responsive only to loading of bread on the carrier to release said carrier from its restrained position, said lever being carried on said bread carrier; means for moving the released carrier to toasting position, at which the bread is toasted, and then back at substantial velocity toward said non-toasting position at which the carrier is to be again restrained, the movement of the carrier with bread loaded thereon, at substantial velocity toward the non-toasting position, having the tendency to effect automatic re-cycling of the carrier movements; and means adjacent the other end of said carrier wholly separate from said release means and for directly engaging said lever only adjacent said non-toasting position and for rendering said release means inoperative as said carrier moves upwardly toward said non-toasting position.

5. A fully automatic toaster comprising, in combination: bread toasting means; a loadable bread carrier cyclically movable relative to said bread toasting means from a non-toasting position to a toasting position and then back to said non-toasting position; means normally restraining the bread carrier in its non-toasting position; release means connected to one end of said carrier responsive only to loading of bread on the carrier to release said carrier from its restrained position; means for moving the released carrier to toasting position, at which the bread is toasted, and then back at substantial velocity toward said non-toasting position at which the carrier is to be again restrained, the movement of the carrier with bread loaded thereon, at substantial velocity toward the non-toasting position, having the tendency to effect automatic re-cycling of the carrier movements; and means adjacent the other end of said carrier wholly separate from said release means and engageable by said carrier, as said carrier rises, and movable by said carrier to a position to cooperate with said bread carrier to prevent automatic re-cycling of the carrier movements.

6. A carriage release for a fully automatic toaster which effects release of a carriage-restraining latch upon loading of a bread slice onto the toaster's carriage at the beginning of a bread toasting cycle and which effects carriage-restraining re-latching at the end of a toasting cycle; said carriage release comprising, in combination: a lever positioned to be engaged by a bread slice that is being loaded onto the toaster's carriage, said lever being mounted for pivoting from a first position to a second position, a latch-release pawl mounted on said lever for pivoting over a range, between an operative, latch-releasing, position and an inoperative position, about an axis parallel to the axis about which the lever pivots, means for pivoting said pawl to an inoperative position when said lever is in its second position and after the pawl has effected release of the carriage-restraining latch, means including movement of said lever to its first position for pivoting the pawl away from its inoperative position and toward its operative position, the pawl being finally movable into its operative position only as the lever is pivoted from said first position to said second position.

7. A carriage release for a fully automatic toaster which effects release of a carriage-restraining latch upon loading of a bread slice onto the toaster's carriage at the beginning of a bread toasting cycle and which effects carriage-restraining re-latching at the end of a toasting cycle; said carriage release comprising, in combination: a lever positioned to be engaged by a bread slice that is being loaded onto the toaster's carriage, said lever being mounted for pivoting from a first position to a second position, a latch-release pawl mounted on said lever for pivoting over a range, between an operative, latch-releasing, position and an inoperative position, about an axis parallel to the axis about which the lever pivots, means for pivoting said pawl to an inoperative position when said lever is in its second position and after the pawl has effected release of the carriage-restraining latch, means for maintaining the pawl in its inoperative position until the lever has been restored to its first position, and means preventing inadvertent return of the lever to its first position.

8. A fully automatic toaster comprising, in combination: bread toasting means; a loadable bread carrier cyclically movable relative to said bread toasting means from a non-toasting position to a toasting position and then back to said non-toasting position; and control means for automatically initiating movement of said bread carrier away from said non-toasting position, upon loading of a bread slice onto the carrier when the carrier is unloaded, and for maintaining said bread carrier in said non-toasting position at the end of a toasting cycle, as long as the carriage is either loaded with at least one toasted bread slice or has not been loaded with a bread slice to be toasted, said control means including a pivotable lever mounted on said carriage and normally biased toward an unloaded position, said lever being adapted to be engaged by a slice of bread entered onto said carriage to pivot to a loaded position, a pawl mounted on said lever for pivoting about an axis parallel to the axis about which the lever pivots, a movable latch biased to engage the carriage to restrain the carriage in the non-toasting position and adapted to be engaged by the pawl to be moved by the pawl away from carriage-restraining position as the lever is being pivoted away from its unloaded position, means for pivoting the pawl to an inoperative position after it has moved the latch and as the carriage moves away from the non-toasting position, and said pawl being so weighted and having its center of gravity so disposed relative to the pivot axis of the pawl that said pawl is maintained in its inoperative position when the lever is in its loaded position.

9. A fully automatic toaster comprising, in combination: bread toasting means, a loadable bread carrier cyclically movable relative to said bread toasting means from a non-toasting position to a toasting position and then back to said non-toasting position, a pivotable lever mounted on said carriage and normally biased toward an unloaded position, said lever being adapted to be engaged by a slice of bread entered onto said carriage to pivot to a loaded position, a pawl mounted on said lever for pivoting about an axis parallel to the axis about which the lever pivots, a movable latch biased to engage the carriage to restrain the carriage in the non-toasting position and adapted to be engaged by the pawl to be moved by the pawl away from carriage-restraining position as the lever is being pivoted away from its unloaded position, means for moving the released carrier to toasting position, at which the bread is toasted, and then back at substantial velocity toward said non-toasting position at which the carriage is to be again restrained, the movement of the carriage with bread loaded thereon, at substantial velocity toward the non-toasting position, having the tendency to effect automatic re-cycling of the carriage movements, and a pivotable cam positioned to be engaged by the carriage as the carriage moves toward non-toasting position to swing a barrier across the path of movement of the lever away from the lever's loaded position, thereby preventing movement of the lever that may initiate re-cycling of the carriage's movements.

10. A toaster comprising, in combination: toasting means, a carriage movable relative to said toasting means between non-toasting and toasting positions, a first normally open switch for controlling energization of the toasting means, electric motor means for at least initiating movement of the carriage from the toasting position toward the non-toasting position, a second switch which is biased toward a closed condition for controlling energization of the said motor means, a part movable with said carriage for closing said first switch as the carriage moves into the toasting position, means including a movable arm for maintaining said second switch open as the carriage moves from the non-toasting position toward the toasting position, means for moving the said arm when the carriage is in toasting position to permit the second switch to be biased closed to energize the motor means to initiate moving the carriage away from the toasting position toward the non-toasting position, lever means connected to said carriage for raising the carriage, and an extension movable with said lever means to engage and move said arm to a position to engage and open said second switch before the carriage reaches the non-toasting position, thereby conditioning the toaster for a succeeding toasting cycle.

11. A toaster comprising, in combination: toasting means, a carriage movable relative to said toasting means between non-toasting and toasting positions, a first normally open switch for controlling energization of the toasting means, electric motor means for at least initiating movement of the carriage from the toasting position toward the non-toasting position, a second switch which is biased toward a closed condition for controlling energization of the said motor means, a part movable with said carriage for closing said first switch as the carriage moves into the toasting position, means including a movable arm for maintaining said second switch open as the carriage moves from the non-toasting position toward the toasting position, means for moving the said arm when the carriage is in toasting position to permit the second switch to be biased closed to energize the motor means to initiate moving the carriage away from the toasting position toward the non-toasting position, lever means connected to said carriage for raising the carriage, and a spring interposed between the lever means and the motor means to modulate the force transmitted to the lever means by the motor means to compensate for variations in the voltage across the motor means.

12. A fully automatic toaster comprising, in combination: bread toasting means including a slotted upright wall separating a chamber in which bread is toasted from a control region, a loadable bread carrier cyclically movable relative to said bread toasting means from a non-toasting position to a toasting position and then back to said non-toasting position, a lever extending through a slot in said upright wall and being pivotably mounted on said carriage with portions of said lever located on opposite sides of said wall, said lever being movable between a pair of positions, a laterally movable latch spaced from said wall in said control region, an elongated pawl pivotally mounted adjacent one end thereof on said lever at a point between said latch and said wall, said pawl being swingable in one direction to extend outwardly of its pivot point toward said latch, the length of said pawl being sufficient to engage said latch to effect movement of said latch as said lever moves from its first position toward its second position, said pawl thereafter being swingable in the other direction toward said wall to space said pawl from said latch when the lever is in its second position, and movement of the lever from its second to its first position operating automatically to effect swinging of the pawl in said one direction.

13. A fully automatic toaster comprising, in combination: bread toasting means including a slotted upright wall separating a chamber in which bread is toasted from a control region, a loadable bread carrier cyclically movable relative to said bread toasting means from a non-toasting position to a toasting position and then back to said non-toasting position, a lever extending through a slot in said upright wall and being pivotably mounted on said carriage with portions of said lever located on opposite sides of said wall, said lever being movable between a pair of positions, a laterally movable latch spaced from said wall in said control region, an elongated pawl pivotally mounted adjacent one end thereof on said lever at a point between said latch and said wall, said pawl being swingable in one direction to extend outwardly of its pivot point toward said latch, the length of said pawl being sufficient to engage said latch to effect movement of said latch as said lever moves from its first position toward its second position, said pawl thereafter being swingable in the other direction toward said wall to space said pawl from said latch when the lever is in its second position, and movement of the lever from its second to its first position operating automatically to effect swinging of the pawl in said one direction, and means for limiting swinging of said pawl in said other direction.

14. A fully automatic toaster comprising, in combination: bread toasting means including a slotted upright wall separating a chamber in which bread is toasted from a control region, a loadable bread carrier cyclically movable relative to said bread toasting means from a non-toasting position to a toasting position and then back to said non-toasting position, a lever extending through a slot in said upright wall and being pivotably mounted on said carriage with portions of said lever located on opposite sides of said wall, said lever being movable between a pair of positions, a laterally movable latch spaced from said wall in said control region, an elongated pawl pivotally mounted adjacent one end thereof on said lever at a point between said latch and said wall, said pawl being swingable in one direction to extend outwardly of its pivot point toward said latch, the length of said pawl being sufficient to engage said latch to effect movement of said latch as said lever moves from its first position toward its second position, said pawl thereafter being swingable in the other direction toward said wall to space said pawl from said latch when the lever is in its second position, and movement of the lever from its second to its first position operating automatically to effect swinging of the pawl in said one direction; and means positioned in said control region between the latch and the pivot point of said pawl, and spaced from said latch across the path of movement of the pawl as it moves with said carriage toward toasting position, for engaging said pawl and for pivoting it in said other direction.

15. A fully automatic toaster comprising, in combination: bread toasting means, a loadable bread carrier cyclically movable relative to said bread toasting means from a non-toasting position to a toasting position and then back to said non-toasting position, a pivotable lever mounted on said carriage and normally biased toward an unloaded position, said lever being adapted to be engaged by a slice of bread entered onto said carriage to pivot to a loaded position and to effect release of the carriage from non-toasting position, means for moving the released carrier to toasting position, at which the bread is toasted, and then back at substantial velocity toward said non-toasting position at which the carriage is to be again restrained, the movement of the carriage with bread loaded thereon, at substantial velocity toward the non-toasting position, having the tendency to effect automatic re-cycling of the carriage movements, and pivotable cam means for engaging the carriage as the carriage moves toward non-toasting position to swing a barrier across the path of movement of the lever away from the lever's loaded position, thereby preventing movement of the lever that may initial re-cycling of the carriage's movements.

References Cited in the file of this patent
UNITED STATES PATENTS

| | | |
|---|---|---|
| 2,294,695 | Sardeson | Sept. 1, 1942 |
| 2,693,143 | Ireland | Nov. 2, 1954 |
| 2,863,377 | Huck | Dec. 9, 1958 |
| 2,950,668 | Blixrud et al. | Aug. 30, 1960 |